United States Patent Office 3,778,393
Patented Dec. 11, 1973

3,778,393
GELS FOR USE IN GEL CHROMATOGRAPHIC PROCEDURES AND PROCESSES FOR PRODUCING THE SAME
Gerd Greber and Herbert Schott, Freiburg im Breisgau, Germany, assignors to Papierwerke "Waldhof-Aschaffenburg" AG, Munich, Germany
No Drawing. Filed Jan. 25, 1971, Ser. No. 109,545
Claims priority, application Germany, Jan. 26, 1970, P 20 03 266.0; June 25, 1970, P 20 31 366.0
Int. Cl. A61k 27/12
U.S. Cl. 260—17.45 G                                 9 Claims

ABSTRACT OF THE DISCLOSURE

Gels having covalent built in nucleic acid groups as an integral part of the gel structure, in which at the least a nucleobase is present which provides the free functional groups required for base coupling or exchange and method of making and using such gels.

---

This invention relates to gels having covalent built in nucleic acid groups as an integral part of the gel structure in which at least a nucleobase is present which provides the free functional groups required for base coupling or exchange and to methods for making and using such gels.

More particularly, this invention relates to such gels, their method of manufacture and their use in fractionation or separation processes, concentration processes, processes for removing impurities, etc.

Studies carried out in connection with base pairing or exchange of nucleosides using on exchangers which contain covalent nucleoside groups as an integral part of the polymer structure have heretofore only been carried out in aqueous solutions. The results of such studies have established that the base pairing when carried out in aqueous medium is so insignificant that such processes are of no technical value. It is only at very high concentrations that a noticeable exchange is demonstrated, that is, in order to realize an efficient separation of a mixture of substances, i.e., nucleic acid building units by base pairing as contemplated by Watson & Crick very high concentrations of the groups required for the pairing or exchange are required to be built into the gel. The required high concentration of covalent built in nucleic acid building units could not be realized with the heretofore available carrier materials. For this reason, an economically feasible separation of nucleic acid building units on a large scale has heretofore not been possible.

It is already known that nucleosides in the presence of an oragnic solvent undergo a much more extensive base pairing than that which takes place in water. The known ion exchangers, however, cannot be used in organic solvents.

It is an object of this invention to provide a polymeric material containing covalent built in nucleic acid groups as an integral part of the polymer structure.

Another object of this invention is to provide a simple and economically feasible method of preparing such polymeric materials.

Still another object of this invention is to provide polymeric materials containing the covalent built in nucleic acid groups incorporated into the polymer structure in a defined manner and number.

A further object of this invention is the use of such polymeric materials for fractionation or separation processes, concentration processes, processes for removing impurities, as therapeutic agents, etc.

Yet a further object of this invention is the use of such polymeric materials for fractionation, separation, concentration, purification and the like procedures carried out in aqueous and/or organic media.

These and other objects and advantages of the invention will become apparent from a consideration of the following disclsoure.

In accordance with the invention, gels having covalent built in nucleic acid structural units are prepared by the steps of reacting a nucleic acid building unit with a reactive compound and then polymerizing the polyfunctional derivative thus obtained with a cross-linking agent to form the cross-linked gel.

Advantageously as reactive compound, a polymerizable unsaturated compound such as acrylic acid chloride, β-isocyanato-methacrylic acid ethyl ester, methacrylic acid anhydride, p-vinyl-benzoyl chloride can be used.

The advantage of the process of the invention lies in that, the nucleobase derivative formed by reacting the nucleic acid building unit and the reactive compound, on being subjected to the cross-linking polymerization forms polymeric carriers with which a sharp separation of nucleic acid building units can be carried out.

It is possible to carry out without any further treatment, a separation of nucleic acid building units in the presence of organic solvents, the base pairing i.e., exchange which is effected in this connection being extremely marked.

It is of considerable importance that the gels prepared according to the process of the invention undergo swelling in organic solvents without any undesirable side effects taking place. In addition, the gels prepared by the process of the invention can be used to treat solutions of essentially higher concentration than heretofore possible. Further regeneration procedures are not required.

In addition, it has been found that the gels prepared in accordance with the invention by cross-linking polymerization of mono- and di-unsaturated nucleoside derivatives can be effectively used for separating lower molecular nuclei acid building units in an aqueous medium. This unexpected finding is to be attributed to the fact that in these gels, the lower molecular nucleic acid building units required for the base pairing are made available in a high concentration on covalent built in nucleoside groups, that is, each basic building unit contains a nucleoside group. As in this process, gels are produced with an optimal loading, i.e. concentration of the covalent built in nucleoside groups. Even in aqueous medium, the minimum necessary concentration of the nucleosides required for separation of low molecular nucleoside building units is obtained. The degree of success of the separation, concentration, purification, etc. procedures utilizing the gels of the invention is influenced by all of those variables which influence base pairing or exchange, i.e., temperature, particle size, concentration, porosity, degree of saturation of the exchange capacity, polymer hydration or swelling, etc.

In this connection, a most important consideration is the exclusion limit effect, i.e., the effect which is directly related to the porosity of the resin and which is an effect much utilized and relied on in gel chromatography.

Although one of the objects in gel synthesis is the formation of a gel having a maximum volume capacity, there are instances in which a gel of lower density is more desirable since the porosity of the gel is dependent upon the degree of cross-linking of the polymer structure. It is quite possible to alter the gel porosity by modification of the degree of cross-linking. By lowering the degree of cross-linking, a resin of higher porosity, lower density, and higher order of hydration is formed. These modifications result in (1) a higher rate of ionic diffusion and therefore a higher rate of exchange; and (2) a higher capacity for ions of high molecular weight. The chief application of this phenomena is in the separation or recovery of components from mixtures of substances having different molecular weights. Thus, it is sometimes convenient to select a gel material that is able to adsorb in the sense of base pairing but one component of the mixture, i.e., to use a gel having a low exclusion limit. Only the low molecular component can penetrate into the gel, i.e., from a mixture of nucleosides, mono- and oligo nucleotides. Only the nucleosides can penetrate into the gel and can as a result be separated out from the mixture on the basis of base pairing. The larger mono- and oligo nucleotides cannot penetrate into the gel and therefore their separation is simply realized. Using a gel with a correspondingly higher exclusion limit, it is possible, using the same principle, to separate the mono- and oligo nucleotides.

It can be appreciated that the utilization of the exclusion limit characteristic of gels greatly enhances and enlarges the scope and varieties of the separations which can be realized.

The gels provided in accordance with the invention can be used over a broad range of organic chemical techniques, i.e., concentration, separation, purification, etc. with very good results. It is possible, for instance without any further steps to fill the gels into tubes and to market the tubes containing the gels of specific characteristics for analytical and/or preparative procedures and to thereby simplify the work load of laboratory personnel.

It has also been established that the gel products of the invention can be used as therapeutic agents characterized by their delayed and protracted activity. Thus, for instance, the gel of the invention is markedly stable under acid conditions as encountered in the stomach, and it is only in an alkaline medium, as for instance, found in the intestine that it undergoes a splitting off of the ester compounds. It is known that many of the natural and synthetic nucleosides have therapeutic activities. Thus, for example, adenosine is of value in cardiac and circulatory conditions, cytidine, uridine in liver conditions, 6-mercaptopurine riboside as a cytostatic agent, etc. The speed of the hydrolysis in the alkaline medium is dependent on the degree of cross-linking of the gel so that it is possible to regulate the degree of the therapeutic activity of the nucleic derivative by varying the degree of cross-linking of the gel.

The following examples are given in order to further illustrate the invention, the same are however in no wise to be construed as limiting the scope thereof.

EXAMPLE 1

23.2 parts 1-($\beta$-glucopyranosyl)-thymine, in divided portions were reacted with 48 parts trimethyl-chlorosilane in 160 parts dry pyridine. Under evolution of heat, pyridinium hydrochloride was precipitated out. After the reaction mixture had been allowed to stand for 20 hours at 0° C., the precipitate was separated by filtration under exclusion of moisture. The pyridine was then taken off under vacuum at a temperature of between 20–50° C. and the residue taken up in dry ether. Any undissolved pyridinium hydrochloride was filtered off. After evaporating the ether from the filtrate, there were recovered 45.1 parts 1 - [2′,3′,4′,6′ - O - tetrakis-(trimethylsilyl)-$\beta$-D-glucopyranosyl]-thymine.

42 parts of the 1 - [2′,3′,4′,6′ - O - tetrakis-(trimethylsilyl) - $\beta$ - D - glucopyranosyl] - thymine were dissolved in 140 parts dry methanol and reacted with 18 ml. of a methanolic $K_2CO_3$ solution (19.9 parts $K_2CO_3$ dissolved in 4.5 parts dry methanol) and allowed to stand for about 3 hours at 20° C. The resulting mixture was neutralized with 4 ml. methanolic acetic acid (9 parts acetic acid in 1 part dry methanol) and the methanolic solution, under stirring, precipitated in water containing NaCl. After filtering and drying, there were recovered 35.5 parts (98%) 1 - [2′,3′,4′ - O - tris - (trimethylsilyl)-$\beta$ - D - glucopyranosyl] - thymine which softened at about 60° C.

Analysis.—Calculated (percent): C, 47.58; H, 7.99; N, 5.55. Found (percent): C, 47.49; H, 7.99; N, 5.60.

7.4 parts methacrylic acid chloride were introduced into a solution of 37 parts 1-[2′,3′,4′,6′ - O - tetrakis-(trimethylsilyl) - $\beta$ - D - glucopyranosyl] - thymine and 7.5 parts dry triethylamine in dry benzene and the triethylamine chloride formed separated out. After 10 hours of standing at room temperature, the triethylamine hydrochloride was filtered off and the benzene solution concentrated to dryness on a rotating evaporator. The pale yellow colored residue consisted of 1 - [2′,3′,4′ - tri - O - (trimethylsilyl) - 6′ - methacryloyl - $\beta$ - D - glucopyranosyl]-thymine which following drying melted at 60° C.

Yield: 40.9 parts=98% theory of pure product.

Analysis.—Calculated (percent): C, 50.32; H, 7.74; N, 4.89. Found (percent): 50.36; H, 7.74; N, 4.74.

A mixture of 5.7 parts 1 - [2′,3′,4′ - tris - O - (trimethylsilyl) - 6′ - methacryloyl - $\beta$ - D - glucopyranosyl]-thymine, 0.75 parts 1,4- butane diol-di-methacrylate, 0.007 part $\alpha,\alpha'$-bisazoisobutyric acid nitrile (AiBN) and 4 parts toluene under $N_2$ were polymerized for 12 hours at 70° C. There was thereby obtained a swollen gel. The gel was broken up into small pieces and extracted with benzene for 3 days in a Kutscher-Stendel apparatus in order to separate out any un-cross-linked portions present. After drying, the gel was ground in a mortar and pestle and separated into various fractions of different particle size. A gel having a N-content of about 0.4% in a yield of between 40 and 80% was thusly obtained.

In accordance with the invention, gels can also be prepared from thymine derivatives which instead of the methacryloyl groups, can contain, for instance p-vinyl benzoyl groups or another polymerizable unsaturated group.

A thymine containing silicon-free gel was recovered by a procedure analogous to that above by treating the swollen gel during the polymerization with a solution of hydrochloric acid in aqueous acetone, (20 parts water/80 parts acetone) pH 1–2, which resulted in a splitting off of the trimethylsilyl groups. Instead of the acetone, other water miscible solvents can also be used.

EXAMPLE 2

22 parts methacrylic acid chloride in 10 parts dry benzene were slowly added in dropwise fashion under stirring at a temperature of 40–70° C. to 28.8 parts 1-($\beta$ - D - glucopyranosyl) - thymine in 150 parts dry pyridine. The stirring was continued for a further 6 hours and the pyridinium hydrochloride formed filtered off, the filtrate concentrated in vacuum and the syrup residue dissolved in benzene. The benzene solution was separated off from any undissolved pyridinium hydrochloride, washed with saturated $N_aHCO_3$ solution and with water. After drying over sodium sulfate, the solution was concentrated in vacuum at 40–60° C. There was obtained 1 - [w′-x′-y′-z′ - O - bis(methacryloyl) - $\beta$ - D - glucopyranosyl]-thymine (34 parts) in a yield of about 80% as a pale yellow product.

EXAMPLE 3

17 parts 1 - [2′,3′,4′ - tris - O - (trimethylsilyl) - 6′-methacryloyl - $\beta$ - D - glucopyranosyl] - thymine were dissolved in 20 parts chloroform and reacted with 1 part 1 - [w′-x′-y′-z′ - O - bis(methacryloyl) - $\beta$ - D - glucopyranosyl]-thymine and 0.05 part AiBN. This solution was polymerized under $N_2$ at 70° C. for 24 hours to form a cross-linked gel. The gel was further worked up as described in Example 1.

EXAMPLE 4

1.1 parts methacrylic acid chloride in 10 parts dry benzene were introduced slowly in drop-wise fashion into a weakly boiling solution of 3.5 parts $N^4$-benzoylcytidine in 30 parts dry pyridine. A pale yellow solution was obtained which was stirred for 6 hours at room temperature. Then, under stirring 3.4 parts trimethylchlorosilane were introduced into the solution. After allowing the reaction mixture to stand for about 5 hours at −16° C., the pyridinium chloride was filtered off, the solution washed with benzene and concentrated in vacuum at 40° C. to form a viscous syrup. The syrup was dissolved in benzene and washed with $N_aHCO_3$ solution and then with water. After drying over sodium sulfate and taking off the benzene in vacuum, there were recovered 4.5 parts analytically pure (about 80% of theory) of $N^4$-benzoyl-$O^{x'}$, $O^{y'}$-bis-(trimethylsilyl)-$O^{z'}$-methacryloylcytidine as a pale yellow powder.

*Analysis.*—Calculated (percent): C, 55.78; H, 6.66; N, 7.51. Found (percent): C, 55.58; H, 6.86; N, 7.68.

If desired, the reaction mixture could also be worked up by pouring the pyridinium hydrochloride containing reaction solution into ice water whereby the desired product separated out in solid form. Still further the sequence of adding methacrylic acid chloride followed by trimethylchlorosilane exchange could be used without any decrease in yield.

EXAMPLE 5

By using a procedure analogous to that of Example 4, there was recovered the bifunctional $N^4$-benzoyl-$O^{x'}$-$O^{y'}$-bis-(methacryloyl)-$O^{z'}$-trimethyl-silylcytidine in a yield of 80% by reacting 1 part $N^4$-benzoyl-cytidine with 2 parts methacrylic acid chloride and 4 parts trimethylchlorosilane.

EXAMPLE 6

40 parts of the mono-substituted product of Example 4 to 10 parts of the bi-substituted product of Example 5 were dissolved in 120 parts toluene. There were added to this solution 0.05 part AiBN and the solution then heated under $N_2$ for 24 hours at 70° C. whereby gel formation took place. The resultant gel was worked up analogously to the procedure of Example 1. In order to separate the N-benzoyl as well as the O-trimethylsilyl protective groups, the gel was treated, under mild stirring over 3 days with an ammonia saturated methanolic solution. Thereafter, the gel was filtered off, washed with methanol, then with water and dried. The recovered gel contained, in contrast to the product of Example 1, only cytidine groups and also a maximal nucleoside concentration.

EXAMPLE 7

20 parts of the mono-substituted product of Example 1 and 4 parts of the bi-substituted product of Example 5 were dissolved in 60 parts toluene. There was added to this solution, 0.05 part AiBN and the resultant solution heated under $N_2$ for 24 hours at 70° C. whereby a gel was formed which was worked up as described in Examples 1 and 6.

EXAMPLE 8

A gel with covalent built in adenosine groups was obtained by a process analogous to that of Example 4 but using 3.7 parts $N^6$-benzoyladenosine instead of 3.5 parts $N^4$-benzoylcytidine and then polymerizing the recovered $N^6$-benzoyl-$O^{x'}$-$O^{y'}$-bis-(trimethylsilyl)-$O^{z'}$-methacryloyl-adenosine analogously to Example 7 with $N^4$-benzoyl-$O^{x'}$-$O^{y'}$-(methacryloyl)-$O^{z'}$-trimethylsilyl-cytidine or analogously to Example 1 by using for the polymerization 1,4-butanediol-di-methacrylate.

EXAMPLE 9

30 parts cytidine gel (according to Example 6) were swelled with a suitable amount of dimethylsulfoxide (DMSO)-chloroform (2:3) and the swollen gel material introduced into a 100 cm. long glass tube having a diameter of about 1 cm. and which tube had been provided with a G2 frit. There were introduced into the thusly packed tube, a mixture of the 4 nucleosides: adenosine, thymidine, cytidine and guanosine in equimolar ratio, in amounts whereby 5 parts DMSO-chloroform (2:3) contain about 5 parts nucleosides (concentration about 1%). The elution was carried out with a flow rate of about 11 ml. DMSO-chloroform mixture (2:3) per hour and resulted in a separation of the 4 nucleosides. In the elution, thymidine was recovered first, then adenosine, cytidine and finally guanosine, all in substantially quantitative yield.

EXAMPLE 10

10 parts cytidine gel (according to Example 6) were swelled in an adequate amount of DMSO-chloroform (2:3) and the swelled gel material filled into a glass tube having a length of about 43 cm. and a diameter of about 1 cm. which had been provided with a G2 frit. There were introduced into the thusly packed gel tube a mixture of thymidine and guanosine in equimolar ratio (about 0.025 part of both nucleosides are contained in about 2.5 parts DMSO-chloroform. The elution was carried out using a flow velocity of 24 ml. DMSO-chloroform (2:3)/hour and resulted in a quantitative recovery of both nucleosides. Thymidine was eluted first followed by guanosine as the last component after 400 ml. of solvent mixture had been passed through the tube. From a starting mixture of 14 parts guanosine and 12 parts thymidine, 13.5 parts guanosine and 11.7 parts thymidine were recovered in analytically pure form after taking off the solvent.

EXAMPLE 11

Analogously to Example 8, a glass column was filled in with cytidine gel prepared according to Example 6. In order to separate the cytidine and $N^4$-benzoyl-cytidine, 0.0125 part of each of the nucleosides were dissolved in 2 parts DMSO-chloroform (2:3) and after introducing the solution into the gel packed tube, elution was carried out with a flow velocity of about 24 ml./hour whereby N-benzoyl cytidine was eluted first and as second component the cytidine was recovered.

EXAMPLE 12

The di-sodium salt of thymidine-5'-mono-phosphoric acid was converted with the aid of an ion-exchanger into the pyridinium form. 3.6 parts of this compound were reacted in 30 parts weakly boiling dry pyridine, slowly, under stirring with a solution of 1.1 parts methacrylic acid chloride in 10 parts dry benzene. The reaction mixture was stirred for a further 6 hours at room temperature. Thereafter, while continuing the stirring, 3.4 parts trimethylchlorosilane were added. The reaction mixture was allowed to stand for about 5 hours at −16° C. and worked up as described in Example 4.

EXAMPLE 13

A glass column having a length of about 20 cm. and a diameter of about 2 cm. provided with a glass frit at one end was filled with water steeped cytidine gel prepared according to Example 6. There was introduced into this packed gel column an equimolar mixture of about 0.25 part cytidine and guanosine in 40 parts water. Using a flow rate of about 145 ml./hour, the column was eluted with water. A substantially quantitative separation of the nucleosides was obtained, the guanosine being the last component eluted.

EXAMPLE 14

A glass column having a length of about 30 cm. and a diameter of about 2 cm. was filled analogously to Example 13 with cytidine gel. About 8 parts guanosine and about 5 parts guanylyl-(3'-5')-cytidine (GpC) in about 20 parts water were introduced into the column and the column eluted with water at a flow rate of about 280 ml./hour. There resulted an approximately quantitative separation, in which the guanosine was eluted as the last component. With a high flow velocity and a low exclusion limit, the cytidine gel allows the large molecules (for instance GpC) to pass through, i.e., they pass predominantly along the outer surface of the gel while the small molecules (of instance, guanosine) under these conditions are diffused into the gel and there in the sense of base pairing later eluted.

EXAMPLE 15

Analogously to Examples 13 and 14, a glass column having a length of 30 cm. was filled with cytidine gel which had been pre-soaked in an aqueous buffer solution. There was introduced onto the gel packing about 8 parts guanosine-5'-monophosphoric acid sodium salt ($Na_2$5'-GMP) 6 parts cytidine-5'-monophosphoric acid (5'-GMP), 7 parts adenosine-5'-monophosphate (5'-AMP), 7 parts uridine-5'-monophosphoric acid sodium salt ($Na_2$5'-UMP), 3.6 parts thymidine, 3.9 parts cytidine, 3.9 parts adenosine and 15 parts guanosine, all of which had been dissolved in 40 parts water. The elution was carried out with the aqueous buffer solution using a flow rate of 360 ml./hour whereby first the nucleotides, then the nucleosides and as the last component guanosine were eluted. All of the components were quantitatively recovered.

EXAMPLE 16

A dark brown colored buffered enzyme solution (protein concentration about 1–10 mg./ml.) based on polysaccharide hydrolase, having a specific activity of 1.36 E/mg. and an extinction ratio 280/260=1.07 [nm.] was stirred with 5 parts of an aqueous buffer steeped cytidine gel (prepared according to Example 6) per 1 part protein, for 1 hour at room temperature. After filtering off the cytidine gel, the enzyme solution was bright yellow and had a specific activity of 1.89 E/mg. and an extinction ratio 280/260=1.43 [nm.].

As can be seen from this example, the gels of the invention can be used not only in columns but can also be introduced as masses into solutions which require purification. The impurities are separated by selection of a suitable gel. In addition, it should be noted, that the best separation or separation effects are realized when the gel is pre-soaked in the same solvent as used in the separation, i.e., the solvent in which the separated substances are to be dissolved.

EXAMPLE 17

There was introduced into a column as described in Example 13, but which was filled with adenosine gel instead of cytidine gel, a mixture of 5 parts thymidine and 5 parts adenosine in 10 parts water. The column was eluted with water at 2° C. whereby first thymidine and then adenosine were quantitatively eluted.

The base pairing, especially of nucleosides and nucleotides, that is of lower molecular nucleobase building units, is favored by lower temperatures. It follows therefore, that by lowering the temperature quantitative separations can be obtained, which for example at room temperature were only incompletely carried out.

EXAMPLE 18

A glass column having a length of about 164 cm. and a diameter of about 1 cm. having a glass frit at its end was filled with aqueous buffer (NaCl, $MgCl_2$, $Na_2HPO_4$~0.0–0.01 mol) soaked cytidine pearl polymerizate. There were introduced into this packed column a mixture of about 5 parts guanosine monophosphate and 5 parts GpG in 5 parts buffer. The column was eluted at a flow rate of about 50 ml./hour with buffer. The guanosine was eluted as the first component. The GpG, after a 25 l. quantity of eluent had been passed through, remained absorbed in the gel material. The buffer was then replaced with distilled water whereupon the GpG was almost immediately eluted.

This finding established that the base pairing of nucleotides and oligonucleotides is increased with salt concentration. Thus the dinucleotide GpG's adsorption was marked as at the used salt concentration, no desorption was possible. A desorption was obtained when the salt concentration was considerably lowered.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A process for the production of a gel that is suitable for use in gel chromatographic procedures, which comprises heating at a temperature of approximately 70° C. for a period of at least several hours in the presence of a catalytic amount of α,α'-azobis(isobutyronitrile) (1) a mixture of 2 compounds selected from the group consisting of 1-[2',3',4'-O-tris(trimethylsilyl)-6'-methacrylyl-β-D-glucopyranosyl]thymine,
1-[2',3',4'-O-tris(trimethylsilyl)-6'-vinylbenzoyl-β-D-glucopyranosyl]thymine,
1-[O,O-bis(methacrylyl)-O-β-D-glucopyranosyl]thymine,
$N^4$-benzoyl-O,O-bis(trimethylsilyl)-O-methacrylyl-cytidine,
$N^4$-benzoyl-O,O-bis(methacrylyl)-O-(trimethylsilyl)-cytidine,
$N^6$-benzoyl-O,O-bis(trimethylsilyl)-O-(methacryly)-adenosine, and
$N^6$-benzoyl-O-O-bis(methacrylyl)-O-(trimethylsilyl-adenosine or (2) a mixture of at least one of the compounds of the foregoing group together with a reactive compound selected from the group consisting of 1,4-butanediol dimethacrylate, acrylyl chloride, ethyl β-isocyanatomethacrylate and methacrylic anhydride, and subsequently recovering the resulting gelled cross-linked polymer.

2. A process as defined in claim 1 in which the gel is produced by heating together 0.75 part of 1,4-butanediol dimethacrylate with 5.7 parts of 1-[2',3',4'-tris-O-(trimethylsilyl)-6'-methacrylyl - β - D-glucopyranosyl]thymine in 4 parts of toluene and 0.00 part of α,α'-azobis(isobutyronitrile) at a temperature of 70° C. for a period of 12 hours.

3. A process as defined in claim 1 in which the gel is produced by heating together 17 parts of 1-[2',3',4'-tris-O-(trimethylsilyl)-6'-methacrylyl - β - D-glucopyranosyl]-thymine dissolved in 20 parts of chloroform with 1 part of 1 - [O-bis(methacrylyl)-β-D-glucopyranosyl]thymine and 0.05 part of α,α'-azobis(isobutyronitrile) at a temperature of 70° C. for a period of 24 hours.

4. A process as defined in claim 1 in which the gel is produced by heating together 40 parts of $N^4$-benzoyl-O,O-bis(trimethylsilyl)-O-methacrylylcytidine and 10 parts of $N^4$-benzoyl - O,O - bis(methacrylyl-O-trimethylsilyl)cytidine dissolved in 120 parts of toluene with 0.05 part of α,α'-azobis(isobutyronitrile) at a temperature of 70° C. for a period of 24 hours.

5. A process as defined in claim 1 in which the gel is produced by heating together 20 parts of $N^4$-benzoyl-O,O-bis(trimethylsilyl) - O - methacrylylcytidine and 4 parts of $N^4$-benzoyl-O,O-bis(methacrylyl) - O - (trimethylsilyl) cytidine dissolved in 60 parts of toluene with 0.05 part of α,α'-azobis(isobutyronitrile) at a temperature of 70° C. for a period of 24 hours.

6. A process as defined in claim 1 in which the gel is produced by heating together $N^6$ - benzoyl-O,O-bis(trimethylsilyl) - O - (methacrylyl)adenosine and $N^4$-benzoyl-O,O-(meth acrylyl)-O-(trimethylsilyl)cytidine.

7. A process as defined in claim 1 in which the gel is produced by heating together $N^6$-benzoyl-O,O-bis(trimethylsilyl) - O - (methacrylyl)adenosine and 1,4-butanediol methacrylate.

8. A process as defined in claim 1 in which the gel is produced by heating together the reaction product of thymidine-5'-monophosphoric acid and methacrylyl chloridine with trimethylchlorosilane.

9. A gel that is suitable for use in gel chromatographic procedures produced in accordance with a process as defined in claim 1.

References Cited

UNITED STATES PATENTS

| | | | |
|---|---|---|---|
| 3,440,190 | 4/1969 | Melby | 260—17.4 |
| 3,658,786 | 4/1972 | Albrecht et al. | 260—210 R |
| 3,725,545 | 4/1973 | Maes | 424—180 |

HAROLD D. ANDERSON, Primary Examiner

E. WOODBERRY, Assistant Examiner

U.S. Cl. X.R.

252—315, 316; 260—17.4 R; 424—180